(12) United States Patent
Seckel

(10) Patent No.: US 6,926,947 B1
(45) Date of Patent: Aug. 9, 2005

(54) DOMED PACKING MATERIAL

(76) Inventor: Peter H. Seckel, Crane's Mill #315, 459 Passaic Ave., West Caldwell, NJ (US) 07006-7464

( * ) Notice: Subject to any disclaimer, the term of this patent is extended or adjusted under 35 U.S.C. 154(b) by 363 days.

(21) Appl. No.: 09/606,555

(22) Filed: Jun. 29, 2000

(51) Int. Cl.[7] .............................. B32B 1/00; B65D 81/03
(52) U.S. Cl. ....................... 428/174; 428/179; 493/967; 229/87.02; 206/585; 206/814
(58) Field of Search ................................. 428/174, 178, 428/181, 179; 53/450, 472; 100/144, 232, 295; 156/197, 204, 209, 212, 219, 227, 228; 206/585, 814; 229/87.1, 87.02; 264/241, 285, 299; 270/41, 42; 425/324.1, 327, 346, 358, 423; 493/967

(56) References Cited

U.S. PATENT DOCUMENTS

| | | | |
|---|---|---|---|
| 1,958,050 A | 5/1934 | Koppelman | 154/55 |
| 2,221,310 A | 11/1940 | Gazelle | 154/45 |
| 2,285,335 A | 6/1942 | Hurt | 41/24 |
| 2,776,452 A | 1/1957 | Chavannes | 18/10 |
| 3,018,015 A | 1/1962 | Agriss et al. | 217/53 |
| 3,026,231 A | 3/1962 | Chavannes | 156/205 |
| 3,086,899 A | 4/1963 | Smith et al. | 154/45.9 |
| 3,142,599 A | 7/1964 | Chavannes | 156/210 |
| 3,231,454 A | 1/1966 | Williams | 161/110 |
| 3,484,835 A | 12/1969 | Trounstine et al. | 161/130 |
| 3,508,992 A | 4/1970 | Chavannes | 156/209 |
| 3,525,663 A | 8/1970 | Hale | 161/68 |
| 3,575,781 A | 4/1971 | Pezely | 161/131 |
| 3,857,144 A | * 12/1974 | Bustin | 156/199 |
| 3,895,456 A | * 7/1975 | Fabre | 46/30 |
| 3,911,187 A | 10/1975 | Raley | 428/180 |
| 3,940,811 A | 3/1976 | Tomikawa et al. | 5/361 |
| 4,518,643 A | * 5/1985 | Francis | 428/131 |
| 5,124,191 A | * 6/1992 | Seksaria | 428/178 |
| 5,201,154 A | 4/1993 | Thomas | 52/102 |
| 5,447,772 A | * 9/1995 | Flieger | 428/99 |
| 5,470,641 A | * 11/1995 | Shuert | 428/178 |
| 5,538,778 A | 7/1996 | Hurwitz et al. | 428/136 |

OTHER PUBLICATIONS

Sealed Air Corporation, "Jiffy Custom Wrap and Kushion Kraft." System Platon, "System Platon Foundation Protector Keeps Your Basement Dry." UKCarpetsdirect.com, "Guide to Underlays."

* cited by examiner

Primary Examiner—Donald J. Loney
(74) Attorney, Agent, or Firm—Thomas L. Adams

(57) ABSTRACT

A packing material having a plurality of domes formed therein, and methods for forming same are provided. A plurality of layers of a substrate are placed together to form a composite material with a plurality of layers, and domes are formed in the plurality of layers. The domes can be formed in more than one direction and can be of different sizes and shapes. Thereafter, the materials can be cut to desired sizes or shapes. The domes formed in the layers are nested and accordingly, the packaging material takes up a minimal amount of space after same is manufactured. This serves to minimize the expense and space requirements for storage and shipping and disposal. In use, the sheets are separated and disoriented to achieve bulk and are utilized for packing. The domes are sized, shaped and positioned to tend against re-nesting.

15 Claims, 14 Drawing Sheets

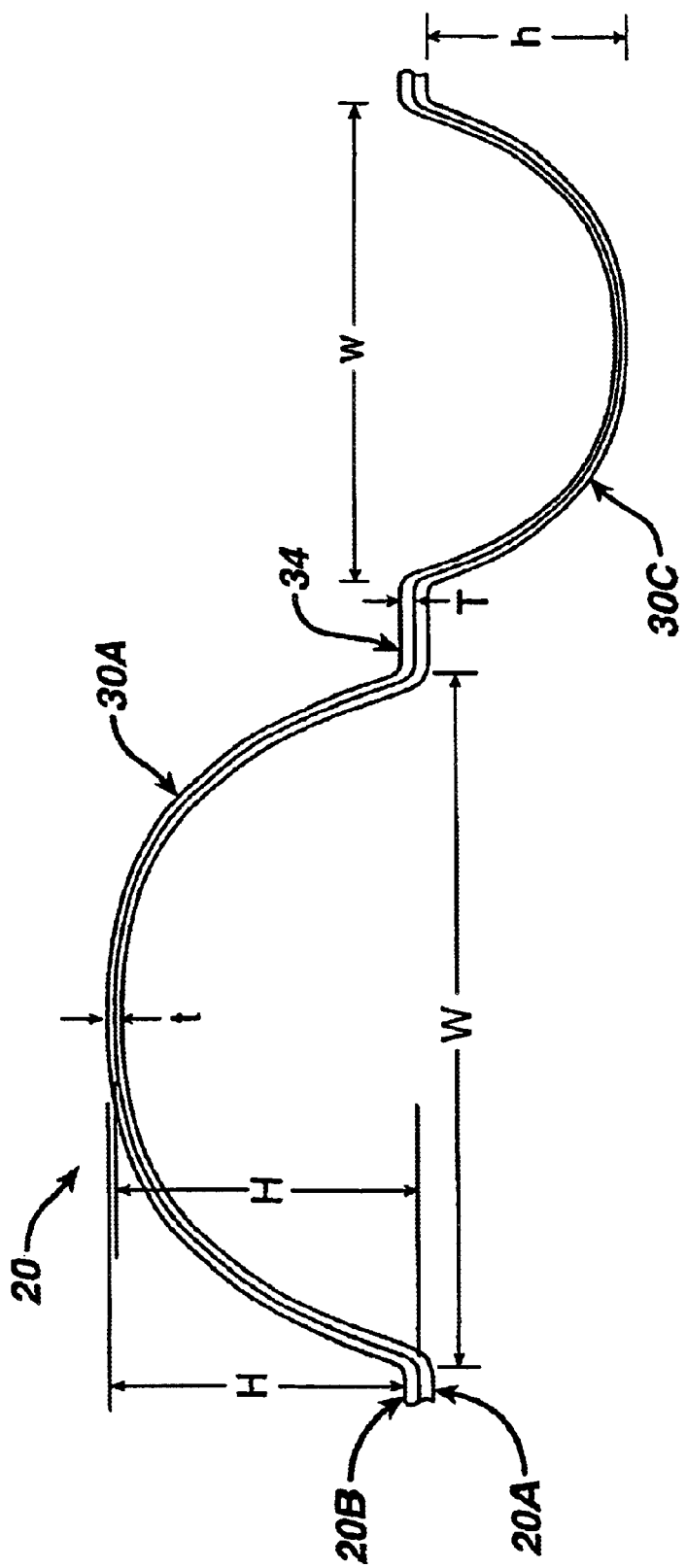

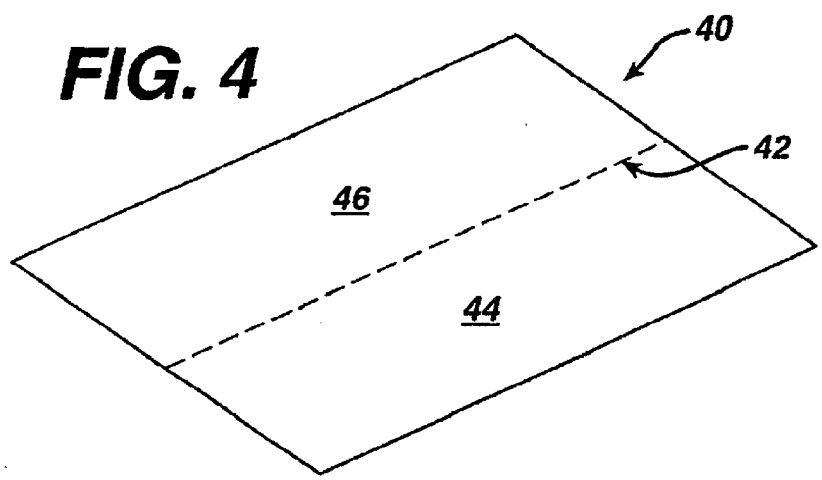
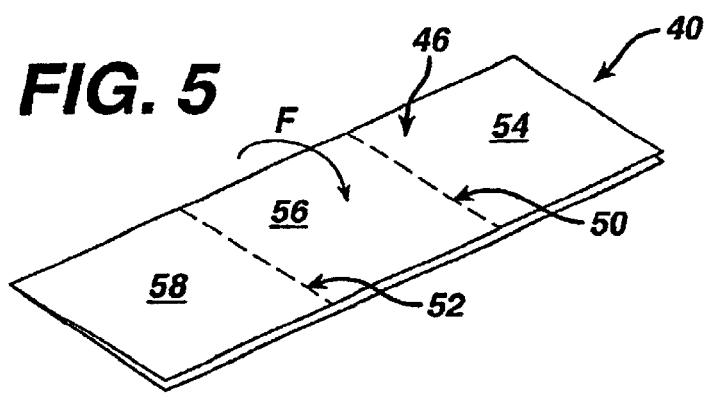
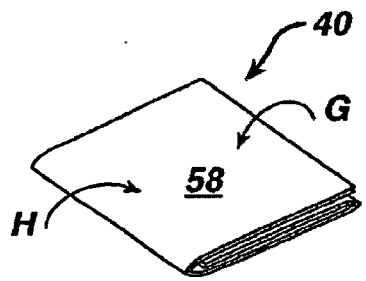
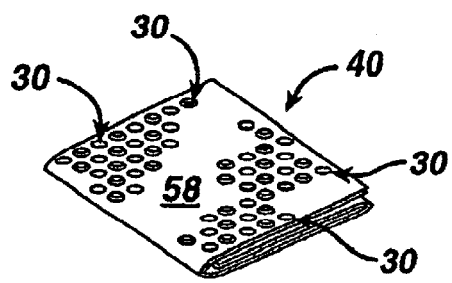

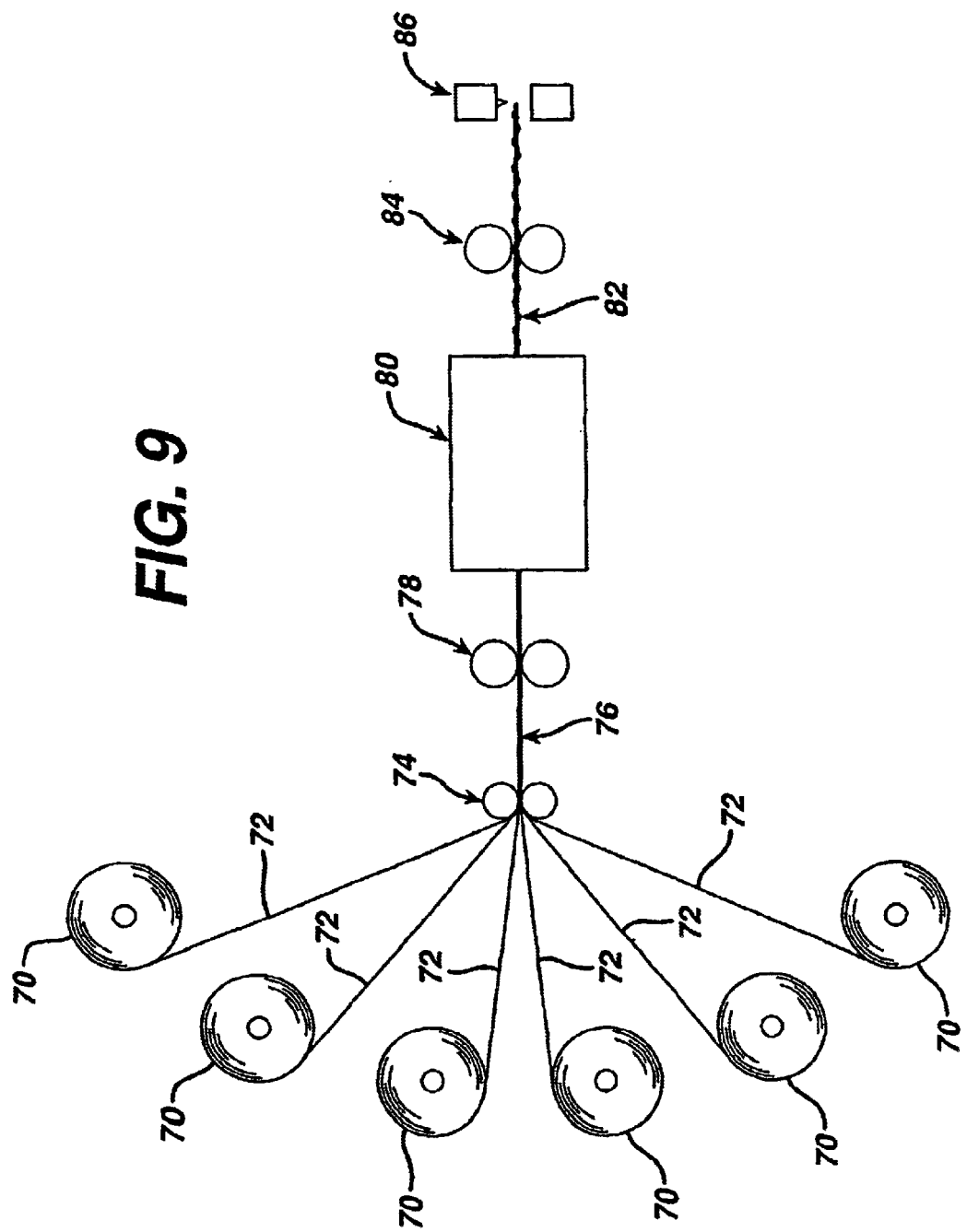

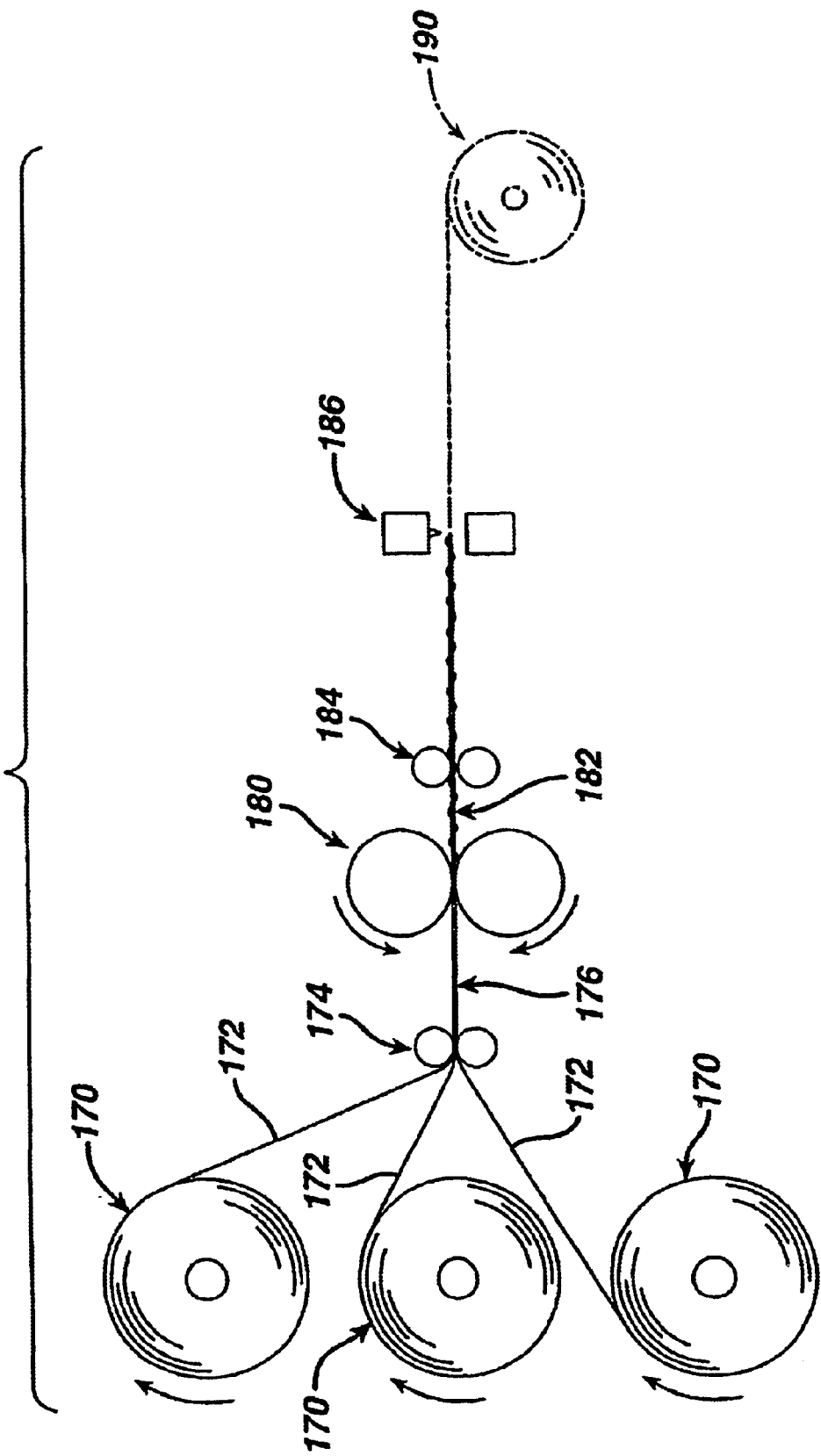

FIG. 12A *PRIOR ART*
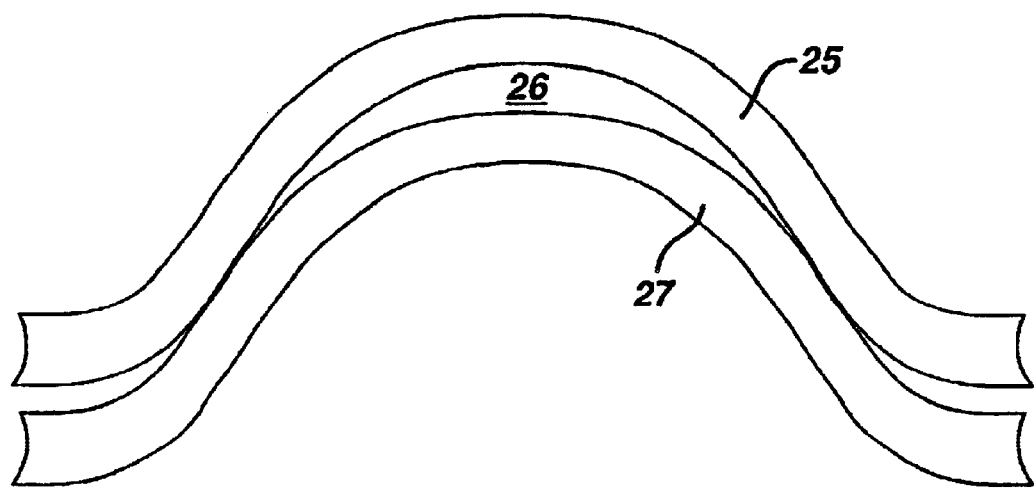
FIG. 12B *PRIOR ART*
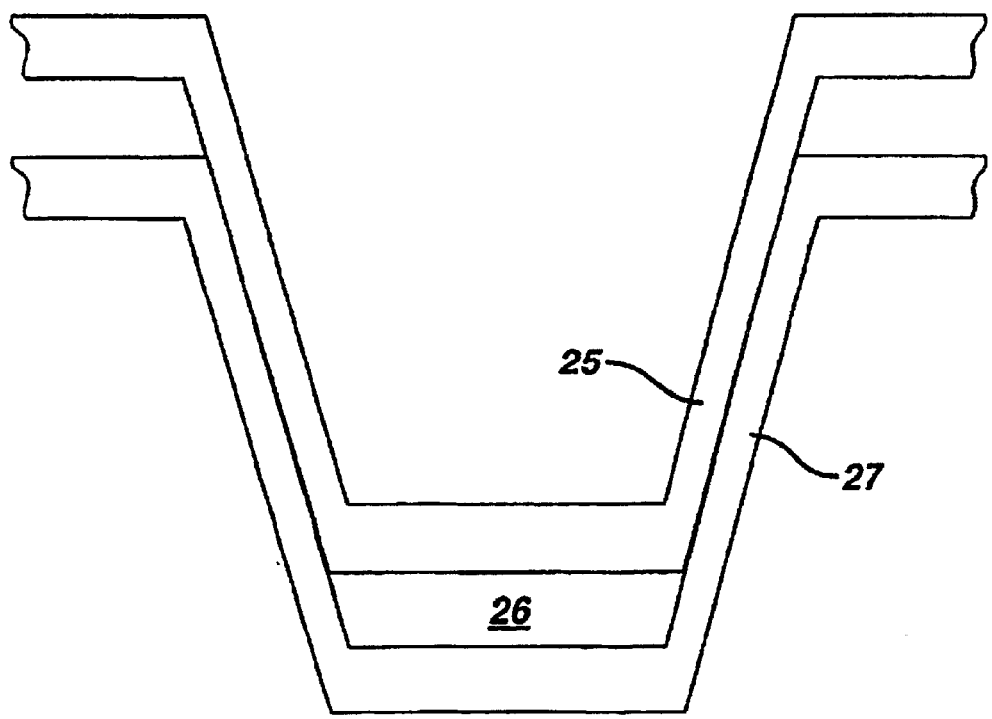

FIG. 13

O = Down dome;  X = Up dome

| | |
|---|---|
| O X O O X O X X | Original algorithm |
| X O O X O X X O | One letter forward, square |
| O O X O X X O X | Ditto, diagonal |
| O X O X X O X O | Ditto, diagonal |
| X O X X O X O O | Ditto, square |
| O X X O X O O X | Ditto, square |
| X X O X O O X O | Ditto, diagonal |
| X O X O O X O X | Ditto, diagonal |

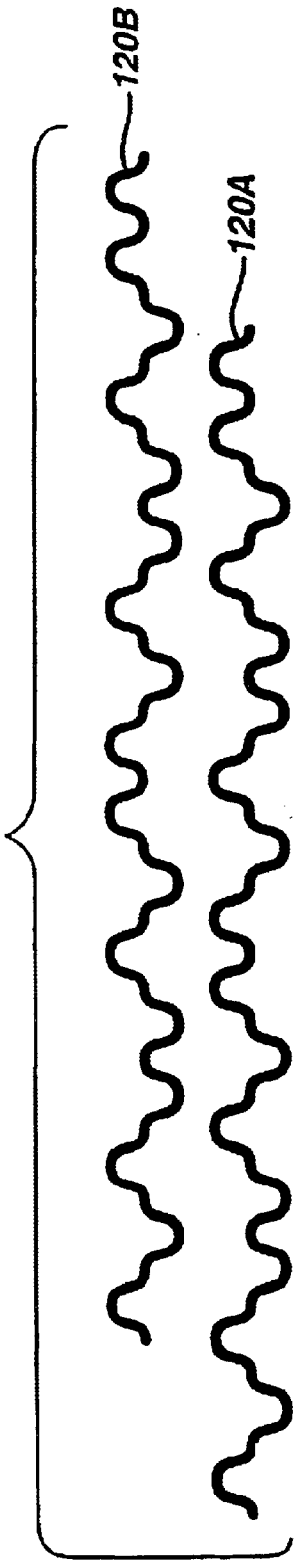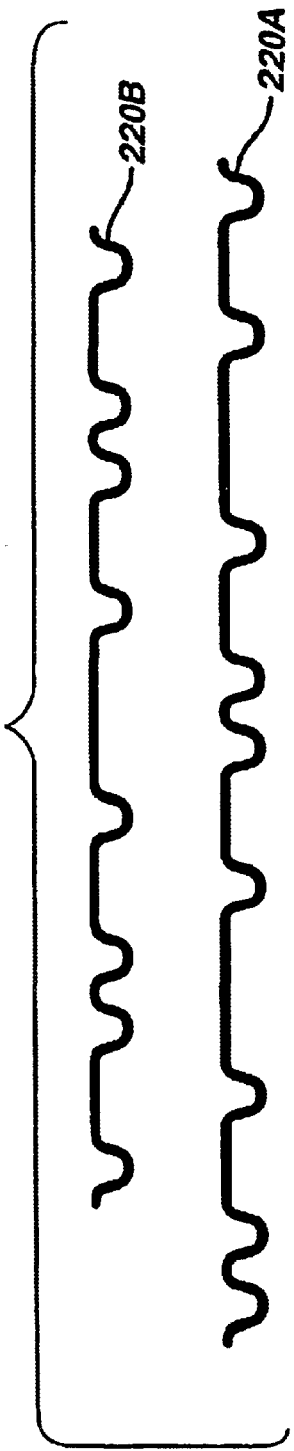

DOMED PACKING MATERIAL

BACKGROUND OF THE INVENTION

1. Field of the Invention

The present invention relates to packing materials for use in cushioning items, and more specifically to a packing material having a plurality of layers of material which nest to take a minimal amount of space prior to use, but which layers can be pulled apart and disoriented to take up a large amount of space to function as a packing material.

2. Related Art

In the past, there have been many attempts to provide packing materials for positioning around items to be shipped in containers, boxes or otherwise. Crumpled newspaper is one such packing material that is and has been in widespread use. Shredded paper is another such material. These materials suffer from moisture absorption and provided limited elastic cushioning. Another common material is plastic "bubble wrap," trademarked "BUBBLE WRAP" by the Sealed Air Corporation and which consists a of lower layer and an upper layer with numerous air bubbles formed therebetween for holding air. This packing material is very useful because it is very light in weight. However, one particular problem with bubble wrap material, which has not been overcome is the fact that even when it is not in use, it still takes up a large amount of space. Bubble wrap material is bulky and space consuming through its entire life—from manufacturing, shipping, storage on distributor and retail shelves, in homes or factories before use and lastly during its disposal. Because of the large continual space requirements, individuals, businesses, and others may be reluctant to purchase and store this material.

Various other types of packing materials have also been invented and used, including, pellets made of styrofoam or other materials, shells made of styrofoam, etc. Another material used for packing is embossed paper. Again, as with the bubble wrap, a common problem among all of these materials is that they are bulky during their entire life.

Other efforts in this and related areas include the following:

U.S. Pat. No. 5,538,778 to Hurwitz, et al., which discloses a cushioning material for packing in the form of an expanded paper material which can be shipped in an unexpanded form and expanded prior to use. It is designed with a plurality of slits and then pulled to form hexagonal cells.

U.S. Pat. No. 4,518,643 to Francis, discloses a plastic film having a permanently embossed design or geometric shape for controlling the coefficient of friction between adjacent sheets of film.

U.S. Pat. No. 3,575,781 to Pezely, discloses a plastic film wrapping material formed with hemispherical protuberances thereon. These sheets will not nest tightly stored on each other.

U.S. Pat. No. 3,231,454 to Williams, discloses a cushioning packaging material formed of either one or two sheets having a plurality of hollow projections extending from one side of the sheet in the same direction. When a bottom surface is utilized, a vent is provided in the projections to allow air to escape. Again, this material will occupy much space prior to use.

Others works, in related areas, include: U.S. Pat. No. 2,285,335 to Hurt; U.S. Pat. No. 5,201,154 to Thomas; U.S. Pat. No. 3,940,811 to Tomikawa et al.; U.S. Pat. No. 3,911,187 to Raley; U.S. Pat. No. 3,525,663 to Hale; and U.S. Pat. No. 3,484,835 to Trounstine, et al.

What has not been previously developed, and what would be highly desirable, is for a packing material that takes up the smallest possible amount of space prior to use, but provides bulk and elastic cushioning when in use. The present invention achieves this, as will be hereinafter described. It is believed that nothing prior hereto has been successful in achieving this, and that none of the previous work of others teaches or suggests all of the aspects of the present invention.

OBJECTS AND SUMMARY OF THE INVENTION

It is an object of the present invention to provide a packing material that takes up a minimal amount of space prior to use, but which can then be converted into a bulky, elastic cushioning packing medium.

It is a further object of the present invention to provide a packing material having domes formed in a substrate.

It is an additional object of the present invention to provide a packing material comprising a plurality of sheets of materials with corresponding domes formed therein, which domes nest completely prior to use.

It is even an additional object of the present invention to provide a domed packing material having a plurality of layers which, when separated and disoriented, take up a large volume of space because of the domes therein.

It is even an additional object of the present invention to provide a packing material comprising a plurality of layers with domes of various sizes and shapes and directions formed therein.

It is even an additional object of the present invention to provide a packing material having a plurality of layers with domes formed therein, wherein the pattern of domes is varied to prevent re-nesting of the layers after they are disoriented.

It is an additional object of the present invention to provide methods for manufacturing the dome packing material of the present invention.

It is a further object of the present invention to provide a packing material that minimizes space and costs associated with shipping, storage, the display thereof for sale and its disposal.

It is an additional object of the present invention to provide a method for manufacturing a packing material that is inexpensive.

It is an additional object of the present invention to provide a method for continuous manufacturing of a packing material.

It is an additional object of the present invention to provide a method for manufacturing a packing material that is capable of being assembled into small units convenient for the display and sale thereof.

It is an additional object of the present invention to provide a method for manufacturing a packing material that is capable of being assembled in standard size boxes for sale and display.

The present invention relates to a packing material having a plurality of domes formed therein. The domes can be formed in more than one direction and can be of different sizes. A plurality of layers of a pliable plastic material are placed together to form a composite material, and domes are formed in the composite material. Thereafter, the composite material can be cut or torn to desired sizes or shapes. Importantly, the domes formed in the layers are tight, nested and accordingly, the packaging material takes up the smallest possible space after same is manufactured. This serves to minimize the expense and space requirements for storage and shipping and disposal. In use, one separates the layers of the composite materials, and disorients same, and utilizes the layers for a packing material. Importantly, it is preferable that the domes are sized or shaped and positioned to tend against re-nesting. Methods of making the material are also set forth.

BRIEF DESCRIPTION OF THE DRAWINGS

Other important objects and features of the invention will be apparent from the following Detailed Description of the Invention taken in connection with the accompanying drawings in which:

FIG. 3 is a cross-sectional view of a plurality of domes taken along line 3—3 of FIG. 1.

FIGS. 4, 5, 6, 7, and 8 are perspective views of a substrate for forming a plurality of layers of packing material by folding one sheet in a plurality of directions, and then processing the sheet to form domes therein, and subsequently unfolding the assembly.

FIG. 9 is a schematic view of a method of forming the domed packing material of the present invention.

FIG. 11 is a schematic view of another method of forming the domed packing material of the present invention.

FIGS. 12A and 12B show prior art materials wherein adjacent layers do not fully nest.

FIG. 13 is a diagram of a potential scheme of domes formed in layers according to the present invention designed to prevent re-nesting of the layers once the layers are disoriented.

FIG. 14 and 15 are side views of a dome scheme designed to prevent re-nesting of adjacent layers after same are disoriented.

DETAILED DESCRIPTION OF THE INVENTION

The present invention relates to a packing material having a plurality of domes formed in multiple assembled layers of material. A plurality of sheets are stacked together and then domes are formed in the assembly such that the domes nest completely. This results in a packaging material that takes up a minimal amount of space prior to use. In use, the layers are separated and disoriented to create a packing material that is bulky and elastic. It is preferable that the domes are varied in size and direction to prevent re-nesting of the layers after they are separated and disoriented.

Figure 1:
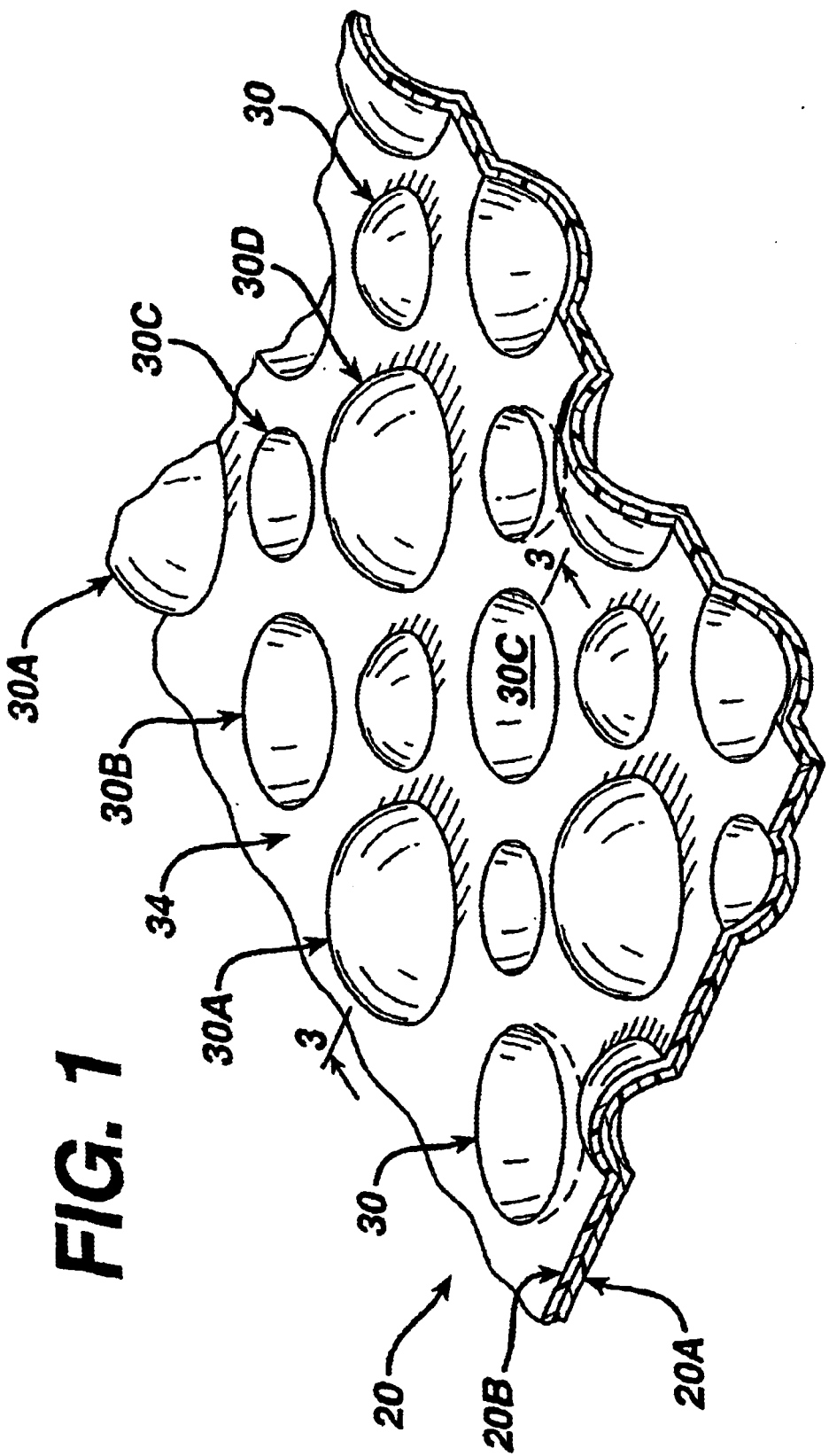
FIG. 1 is a partial perspective view of the domed packing material of the present invention having a plurality of domes of different shapes and directions formed in a plurality of tight layers.

Referring to FIG. 1, a partial perspective view of the domed packaging material, generally indicated at 20, is shown. As can be seen, in this view, there is a lower layer generally indicated at 20A and an upper layer generally indicated at 20B. Each layer comprises a film having a thickness in the area of 0.005–0.015 inches. A plurality of layers such as five or six, or more, can be utilized. As can be seen, the packaging material 20 includes a generally flat portion 34 and a plurality of domes 30 extending in various directions, i.e. up dome 30A or down dome 30B in a plurality of sizes such as small dome 30C and large dome 30D. The variation in dome size and direction serves to prevent the re-nesting of sheets of the packaging material 20 after same are separated. Domes of one size, two sizes, or many sizes and shapes can be used, as desired. Likewise, the domes can extend in one direction or both directions. As can further be seen in viewing FIG. 1, the two layers 20A and 20B take up a minimal amount of space as same are nested together. By "nesting" it is meant that there is no air space between the adjacent layers 20A and 20B at the flat portion 34, as well as at the domes 30. In use, as will be hereinafter discussed, after layers 20A and 20B are separated and disoriented, the domes 30 and the respective layers 20A and 20B serve to separate the layers 20A and 20B, and take up a much larger amount of space to function as a packing material.

Figure 2:
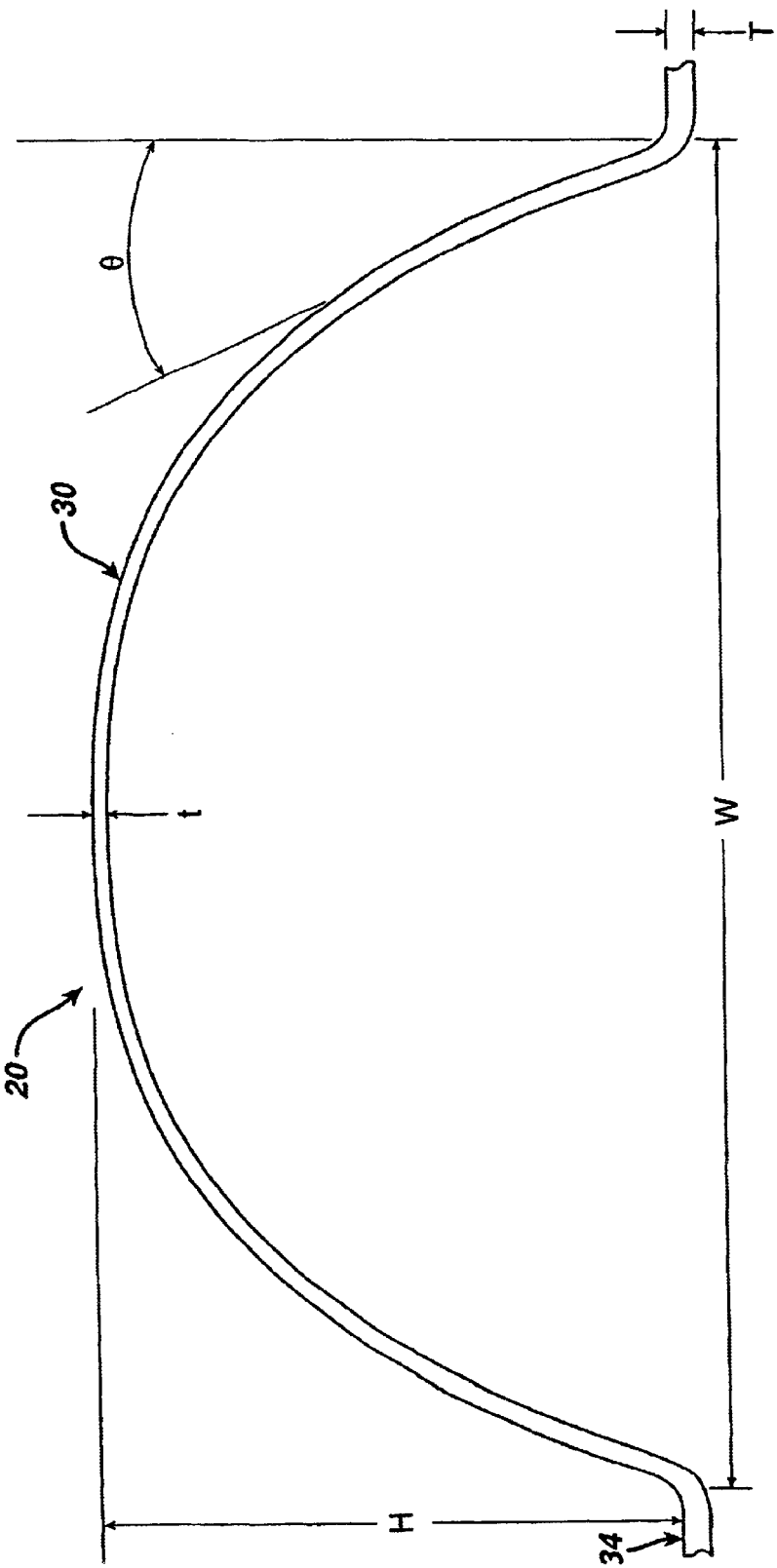
FIG. 2 is a cross-sectional view of a dome in the packing material shown in FIG. 1.

FIG. 2 is a cross-sectional view of a dome 30 of the domed packing material 20. The flat portion 34 of the domed packing material 20 is also shown. The flat portion 34 has a thickness of T, which tapers to a thickness of t at an upper portion of the dome 30. This difference in thickness of the material comprising the dome 30 is accounted for by the stretching associated with forming a dome 30 in the domed packing material 20 which is formed of a polymeric material and stretches during the dome formation process. Additionally, the dome has a height H, a diameter W. Finally, the dome 30 extends from the flat portion 34 at an angle indicated at θ. The angle θ can clearly be varied as desired. Indeed, the shape of the domes 30 can be varied from dome shapes to any other shape such as pail shaped, square, star shaped, elongated, etc., as desired. However, angles of 45 degrees or less are thought to provide the necessary structural compression resistance.

FIG. 3 is a cross-sectional view of the packing material shown in FIG. 1 taken along line 3—3. As can be seen, the domed packing material 20 includes large up dome 30A, and smaller down dome 30C. Flat portion 34 is also pictured. As previously set forth in describing FIG. 1, the domed packing material 20 as shown includes a lower layer 20A and an upper layer 20B. Additional layers would normally be formed at the same time. Up dome 30A has a diameter W, and a height of H for each layer 20A and 20B. For domes to nest completely, each successive dome needs to be smaller, or respectively larger. An unexpected observation is that the change in size affects the side-to-side diameter, but not the height. It is believed that suitable heights H for the domes are approximately ⅛ to 5/16 of an inch, but this can be varied as desired. Further, each layer 20A and 20B has a thickness T along the flat portion 34 (on the order of 0.009 inches thick) and a thickness t at an upper portion of the dome 30A. T is greater than t (t may be about 30% less than T) based on the stretching that occurs during formation of the dome 30. Similarly, small down dome 30C had a diameter w and a height h. The height h of the dome 30C is the same for both layers 20A and 20B. Also, there is a difference between the thickness T of the base 34 and the thickness of the small down dome 30C at a mid-portion thereof, again caused by the stretching that occurs during dome formation.

Because the layers are formed together as one single assembly, each dome will be a slightly different shape so that all stacked domes will necessarily nest absolutely tightly.

Referring now to FIGS. 4–8, a method of forming a plurality of layers from a single substrate, for forming domes therein, is disclosed. First, as shown in FIG. 4, a sheet of material 40 includes a longitudinal fold line 42 which divides the sheet into first half 44 and second half 46.

Referring to FIG. 5, when the sheet 40 is folded in direction of arrow F to position the second half of the sheet 46 over first half of the sheet 44, the sheet becomes half size. A first lateral fold line 50 and a second lateral fold line 52 are provided to divide the sheet 40 further into upper portion 54, middle portion 56 and lower portion 58. Referring to FIG. 6, upper portion 54 can be folded onto middle portion 56 along fold line 50 in a direction shown by arrow G and thereafter, lower portion 58 can be folded over upper portion 54 in the direction of arrow H to fold the substrate 40 to a panel having one-sixth of its original size.

Figure 8:
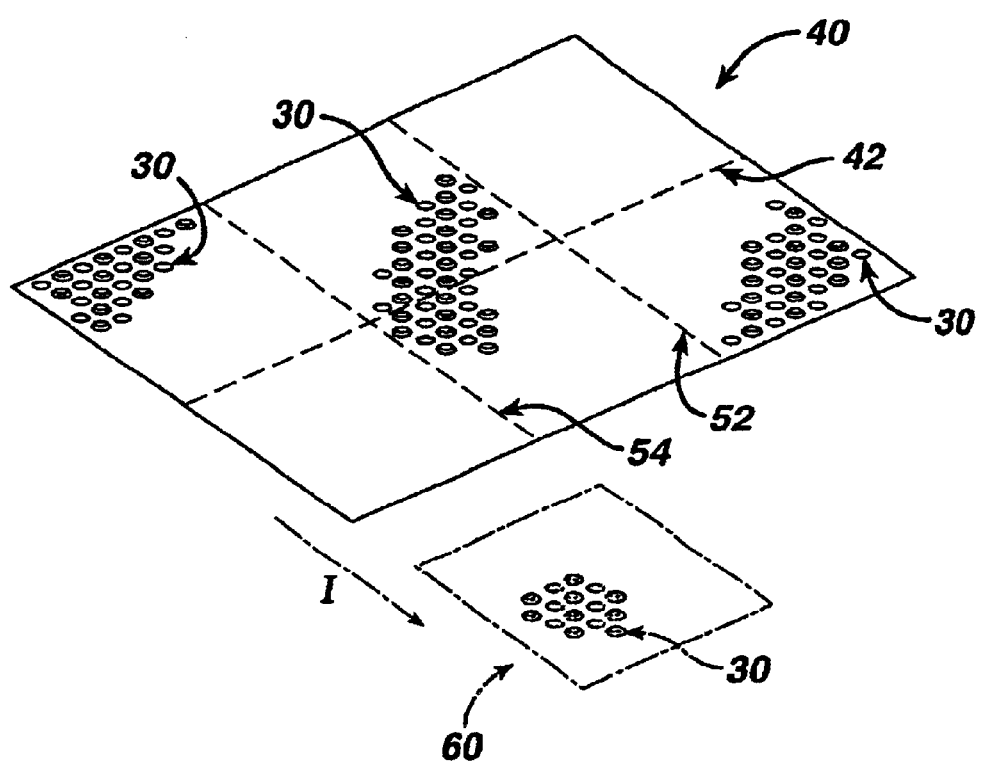

Thereafter, as shown in FIG. 7, the folded material can be processed to form domes 30 in substrate 40 in accordance with the teachings of the present invention. Thereafter, the sheet can be unfolded as shown in FIG. 8 and portions 60 with domes 30 can be separated from the sheet 40 for use. Alternatively, the sheet can be re-folded, along different fold lines than those already provided to effectively disorient the domes 30 such that the material generally takes up a large amount of space. Alternatively, more than one panel 60 can be utilized together to function as packing material. Importantly, the product shown in FIG. 8, if, for example, the substrate 40 is a eight and one-half by eleven inch assembled sheet, or other standard size, it can be easily packaged in a standard office box or other convenient package and can be easily stored, displayed and purchased because it does not take up a large amount of space and can be easily handled in a manner similar to the way other packages of similar sizes are handled. Accordingly, the nested packing material of the present invention can be provided in a compact package desirable to the retailer and consumer.

Referring to FIG. 9, another process for manufacturing the domed packing composite of the present invention is presented. As can be seen, a plurality of rolls 70 of substrate material such as plastic sheets 72 are provided. Sheets 72 are fed into a first roller 74, where the sheets are put together to form a composite sheet, and then to a second roller 78 which serves to feed the composite sheet 76 formed by the plurality of layers 72. The composite sheet 76 is then fed into processing station 80 where domes are formed in the material to provide a domed sheet 82, which is again fed through third rollers 84 to pull the domed sheet 82 from the processing station 80 and feed the domed sheet 82 to a cutting station 86 wherein the domed sheet 82 is cut into desired sizes for packaging.

FIG. 11 shows another embodiment of a manufacturing process according to the present invention wherein a plurality of rolls, generally indicated at 170, of plastic sheets 172 are fed to a first roller 74 which combines the sheet into a composite sheet 176 which is then fed through textured rollers 180 which forms domes in the material to produce a domed sheet 182 which is then fed through a tensioning second roller 184 and then fed to cutting station 186 or, which can be packaged into rolls 190.

Figure 10A:
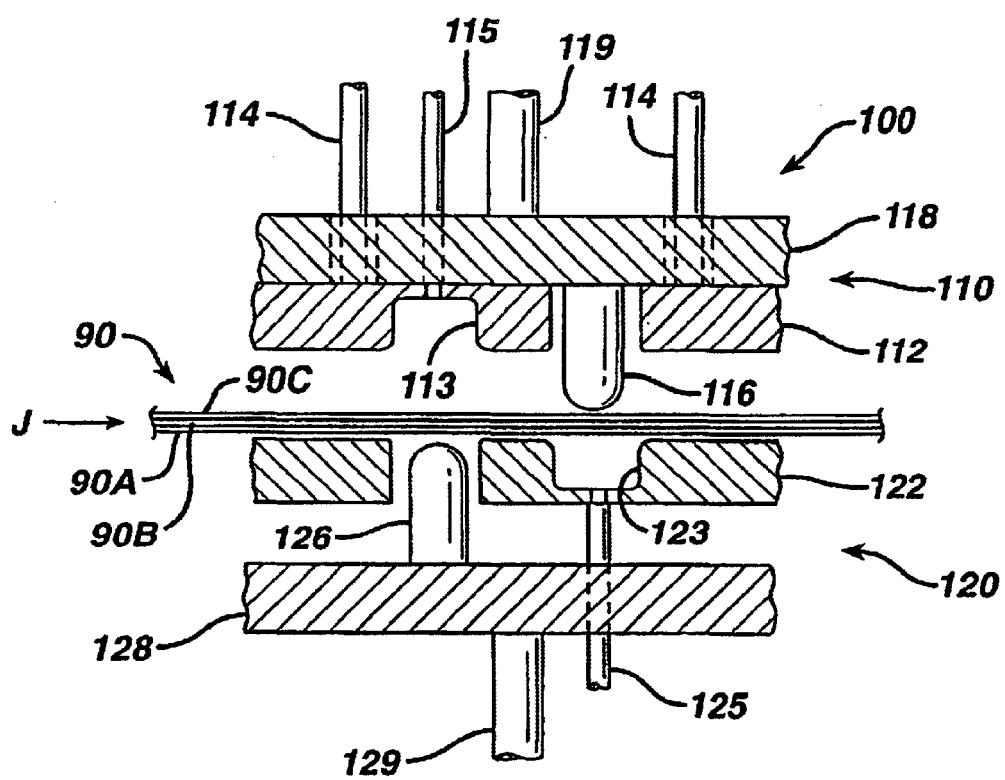
FIGS. 10A–10D show steps for another method of forming the domed packing material of the present invention.

Referring now to FIGS. 10A–10D, a series of processing steps is shown in connection with a batch method of manufacturing the dome packaging material of the present invention. As shown in FIG. 10A a substrate 90 is fed into a press, generally indicated at 100 in a direction shown by arrow J. The substrate 90 can include a plurality of layers such as lower layer 90A, middle layer 90B and upper layer 90C. The press 100 includes an upper press 110 and a lower press 120. The upper press 110 includes an upper clamping plate 112 that is driven by clamping pistons 114 and dome ejector 115. The upper press 110 further includes dome die 116, dome die plate 118, and dome dye piston 119. The lower press 120 includes a fixed lower base clamp plate 122, a dome ejector 125, lower dome die 126, dome die plate 128 and dome die plate piston 129. Die domes 116 and 126 preferably have rounded edges to stretch but not pierce the substrate 90.

Figure 10B:
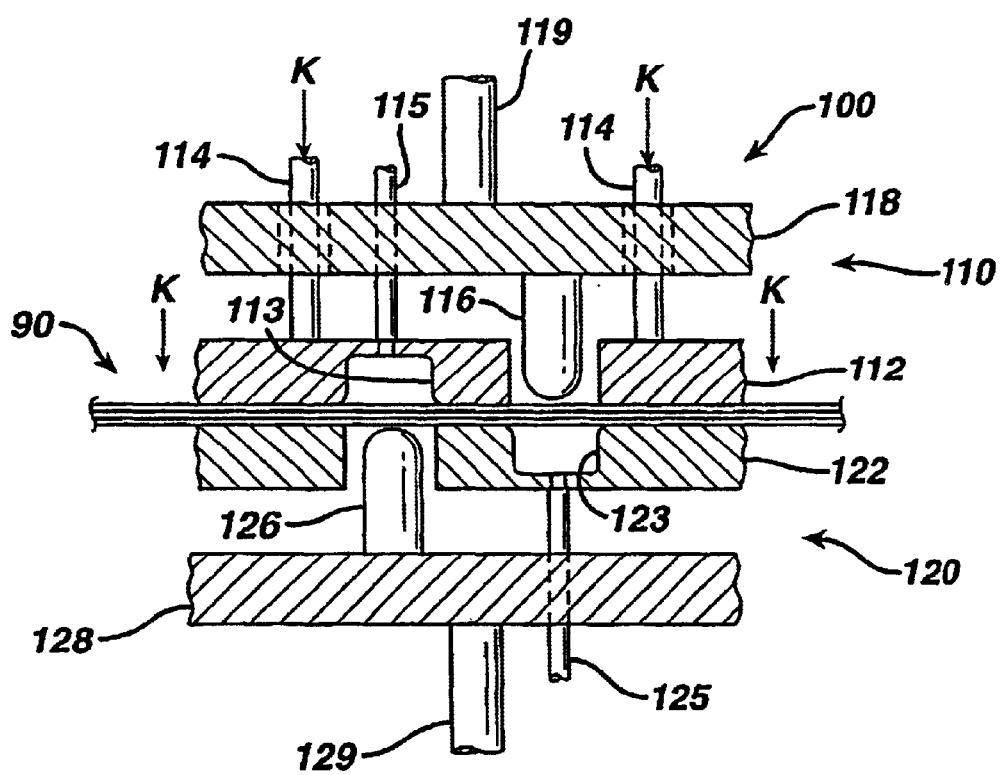

As shown in FIG. 10B, the substrate 90 is maintained between upper and lower clamp plates 112 and 122 respectively by actuating clamp pistons 114 to move the upper clamp plate 112 in the direction shown by arrows K to sandwich the substrate 90 against the fixed lower base clamp plate 122.

Figure 10C:
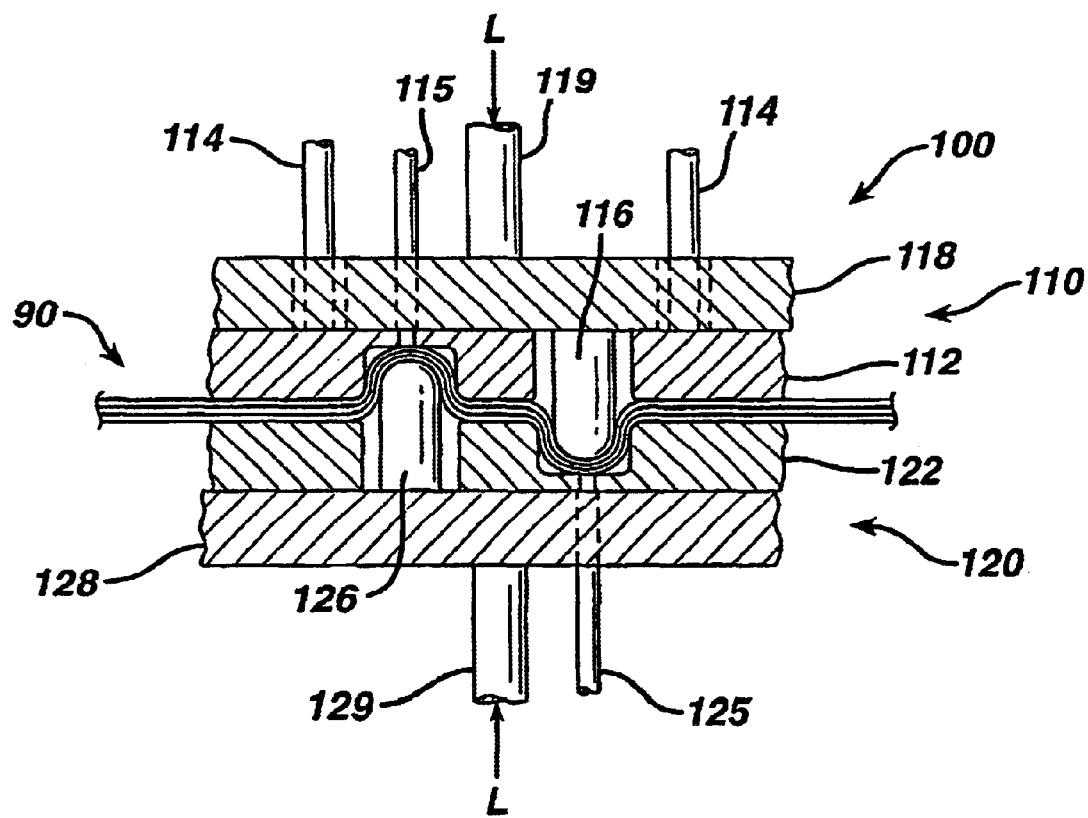

Referring to FIG. 10C, after the substrate 90 is retained between upper and lower clamp plates 112 and 122 respectively, the upper and lower dome die plates 118 respectively are engaged by actuating dome die pistons 119 and 129 respectively to force dome dies 116 and 126 in the directions shown by arrows L, against the substrate 90 and into receptacles 113 and 123 (FIG. 10B) of clamp plates 112 and 122 respectively, to deform the substrate 90 to form domes 30 therein. Importantly, it is desirable that the receptacles 113 and 123 have angled or rounded edges 113A and 123A (FIG. 10D), respectively, to allow the substrate 90 to slide and stretch instead of breaking.

Figure 10D:
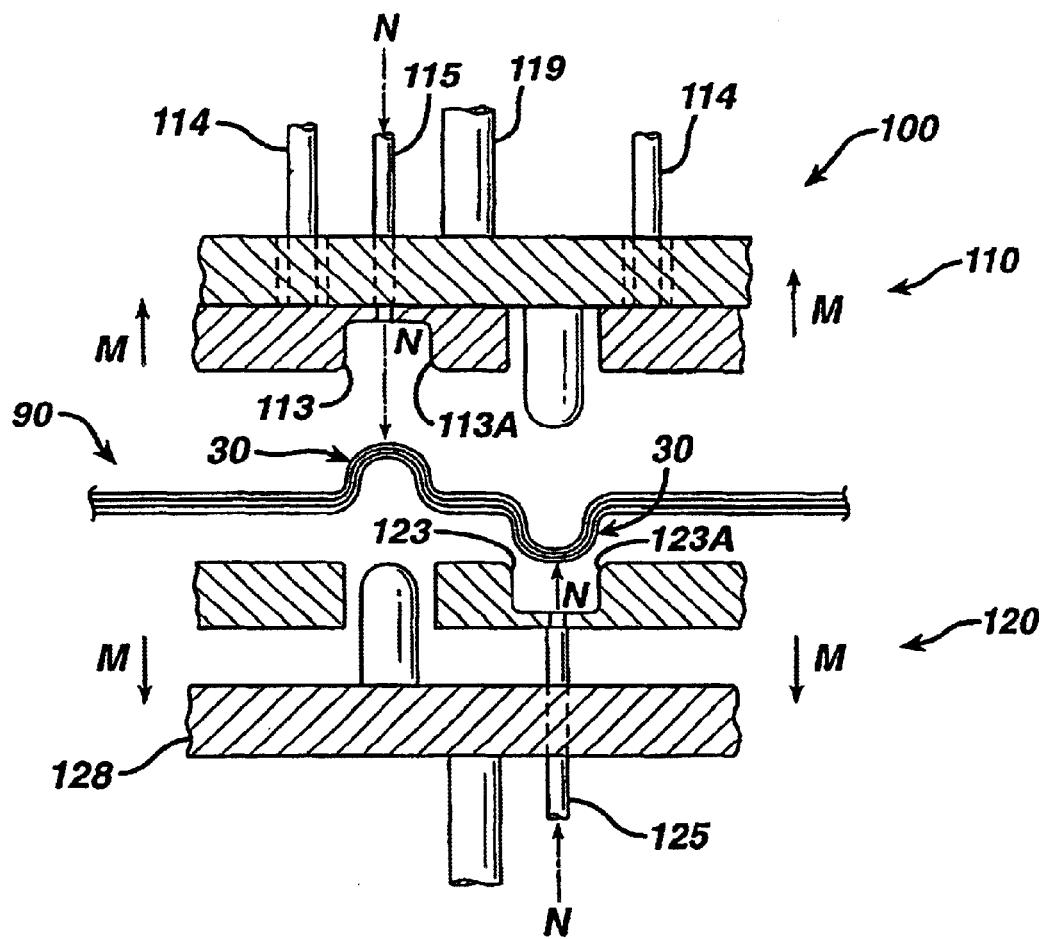

FIG. 10D, shows the separation of upper and lower presses 110 and 120 in the directions of arrow M which allows for the substrate 90 with domes 30 to be removed from the press. Importantly, dome ejectors 115 and 125 may be needed to fully eject the domes 30 from the receptacles 113 and 123. The dome ejectors 115 and 125 could be air conduits and a blast of air in the direction shown by arrows N would be sufficient to disengage the domes 30 from the receptacles 113 and 123. Importantly, as can be seen, the layers forming substrate 90, and the domes 30 formed therein, are completely nested. In use, the layers forming substrate 90 are separated and disoriented to provide a packing material that takes up a large volume of space.

FIGS. 12A and 12B show protuberances formed in substrates according to the prior art. Previously, various substrates are separately manipulated to form identical domes. Such identical domes, cups or other protuberances can never nest completely because the outside diameter of the next dome can only fit to where the inside diameter of the previous one allows it. This results in air spaces, 26, between the tops of the domes and between the substrates. Consequently, the layers and protuberances of the prior art are at best "loosely stacked." This results in a bulky product that does not have all the benefits of the present invention, e.g. the nesting which permits the domed packaging material to occupy a minimal amount of space prior to use. Also, large sheets cannot be made by folding and forming and then unfolding.

FIG. 13 is a schematic diagram showing a key where 0 indicates a down dome and an X indicates an up dome. Thereafter, a pattern or algorithm of up and down domes is presented which is believed to provide a pattern that, after formed in a plurality of layers of a substrate, when the layers are separated and disoriented, it is believed that this pattern will tend to reduce the re-nesting of the layers. Importantly, any pattern or dome shapes that are non-repetitive would serve to decrease the likelihood of re-nesting. While any pattern of domes is considered to be within the scope of the present invention, the more non-repetitive, the better. As can also be seen with FIG. 13, besides varying domes from up and down, they can also be varied in positioning, i.e. they can be in front or behind, i.e. they can be aligned vertically (square) or diagonally to further decrease repetitiveness, and consequently, decrease the likelihood that separated layers will re-nest.

FIGS. 14 and 15 are side views of up and down or down only respectively, dome patterns made in accordance with the present invention wherein the domed patterns can be formed in adjacent layers for example, layer 120A and 120B in FIG. 14 and layers 220A and 220B in FIG. 15. In a formed position, the layers have the same pattern of domes formed therein, but when the layers are separated and disoriented, the dome patterns tend to resist and prevent re-nesting and serve to maintain the packing material in a condition wherein same takes up a relatively large space.

Importantly, the product of the present invention can be made utilizing a cold or thermoforming process, or in other ways known in the art. Also, the present invention is very suitable for use with recycled scrap polymeric materials as long as they are ductile when at heated or cold temperatures and flexible and elastic in their natural state. One example of an appropriate material is PETE (amorphous polyethylene terephthalate).

Importantly, one can easily dispose packing material after use in any desired manner. While packing material such as bubble wrap continues to occupy space after use, the domes of the present invention can be collapsed by the application of sufficient pressure.

Having thus described the invention in detail, it is to be understood that the foregoing description is not intended to limit the spirit and scope thereof. What is desired to be protected by Letters Patent is set forth in the appended claims.

What is claimed is:

1. A domed packing material comprising:
   a plurality of separable layers of plastic material each having a region containing a plurality of domes in a pattern extending in two directions, said plurality of domes being nested together in said region, adjacently nesting ones of said plurality of domes being sized differently to allow nesting substantially without any space between adjacently nesting ones of said plurality of domes, said plurality of domes each being at least ⅛ inch high, said plurality of domes each having a top, a base and a side. extending from the top to the base at a diverging angle, wherein said plurality of separable layers with the plurality of domes can be separated and disoriented to occupy a larger volume.

2. A domed packing material according to claim 1 wherein said plurality of separable layers comprise a single sheet folded to form said plurality of separable layers.

3. A domed packing material according to claim 1 wherein said pattern is non-repetitive.

4. A domed packing material according to claim 1 wherein said pattern is asymmetrical.

5. A domed packing material according to claim 1 wherein said pattern has some laterally adjacent ones of said plurality of domes oriented to protrude in opposite directions.

6. A domed packing material according to claim 1 wherein said pattern has some laterally adjacent ones of said plurality of domes on a common one of said plurality of separable layers sized differently.

7. A domed packing material according to claim 1 wherein said pattern has some laterally adjacent ones of said plurality of domes shaped differently.

8. A domed packing material according to claim 1 wherein said pattern has said plurality of domes formed into a plurality of rows.

9. A domed packing material according to claim 8 wherein some but not all adjacent ones of said rows are diagonally staggered.

10. A domed packing material according to claim 9 wherein said pattern has some laterally adjacent ones of said plurality of domes oriented to protrude in opposite directions.

11. A domed packing material according to claim 1 wherein said plurality of separable layers before separation have an overall length and width equivalent to standard letter stock.

12. A domed packing material according to claim 1 wherein said plurality of separable layers before separation have an overall length and width equivalent to standard legal stock.

13. A domed packing material according to claim 1 wherein said plurality of separable layers before separation have an overall width of about 8.5 inches.

14. A domed packing material according to claim 1 wherein said plurality of separable layers is thinner at the top of said plurality of domes than at locations between laterally adjacent ones of said plurality of domes.

15. A domed packing material according to claim 1 wherein each of said plurality of separable layers is at most 0.010 inch thick.

* * * * *